Aug. 8, 1967 N. F. PRIEBE 3,335,369

SYSTEM FOR DATA COMMUNICATION BY PHASE SHIFT OF SQUARE WAVE CARRIER

Filed June 1, 1964

3 Sheets-Sheet 1

INVENTOR.
NORMAN F. PRIEBE

BY

Thomas J. Nikolai

ATTORNEY

Aug. 8, 1967 N. F. PRIEBE 3,335,369

SYSTEM FOR DATA COMMUNICATION BY PHASE SHIFT OF SQUARE WAVE CARRIER

Filed June 1, 1964 3 Sheets-Sheet 2

Aug. 8, 1967

N. F. PRIEBE 3,335,369

SYSTEM FOR DATA COMMUNICATION BY PHASE SHIFT OF SQUARE WAVE CARRIER

Filed June 1, 1964

3 Sheets-Sheet 3

United States Patent Office 3,335,369

Patented Aug. 8, 1967

3,335,369
SYSTEM FOR DATA COMMUNICATION BY PHASE SHIFT OF SQUARE WAVE CARRIER

Norman F. Priebe, Eagan Township, Dakota County, Minn., assignor to Sperry Rand Corporation, New York, N.Y., a corporation of Delaware Filed June 1, 1964, Ser. No. 371,429
10 Claims. (Cl. 325—30)

ABSTRACT OF THE DISCLOSURE

A data communication system utilizing digital logic and switching circuits for performing modulating and demodulating and synchronizing operations in the transmission of digital data is described. Binary coded data signals are used to modulate a regularly occurring series of carrier signals. As the binary data signals change state, a phase shift of the carrier is generated. The modulated carrier is operated on by a synchronizer in the receiver to produce synchronizing pulses for controlling the timing of the demodulation. Digital logic is used for performing modulation, as well as demodulation and synchronization in the receiver.

This invention relates generally to a communications system for transmitting data from a sending station to a receiving station, and more specifically to a system for the transmission and reception of digital data wherein digital type logic and switching circuits are employed in place of conventional analog circuits such as balanced demodulators, filters and like components.

In the Losee Patent, 3,028,487, which was issued April 3, 1962, there is disclosed a typical example of a prior art circuit for extracting (demodulating) the intelligence from a phase modulated carrier wave. It is to be noted that the phase detector employed therein, which is used to compare the relative phase of successive incremental portions of a pulse phase modulated carrier wave, comprises a didoe ring demodulator, an analog circuit which is quite well known in the art.

According to the teachings of the present invention, the analog circuits of the type shown in the aforereferenced patent are replaced with digital logic circuits including gates, inverters, flip-flops and the like. As a result there is a marked savings achieved through economy of components and, in addition, the circuits of the present invention permit digital data to be transmitted and received at substantially higher bit rates and with higher immunity to perturbations caused by noise than can be achieved using prior art techniques.

In accordance with the teachings of the present invention, the modulator portion of the system includes logic circuits for permitting a binary coded data signal to modulate a regularly occurring source of pulse type clock signals. The information is coded on a phase shift on change of data coding scheme. That is, each time the information to be transmitted as a serial train of signals to the receiving station changes from an arbitrarily defined binary "1" state to a binary "0" state, or from the binary "0" state to the binary "1" state, the data signal used to modulate the carrier changes level. Each level change in turn causes a phase shift of the carrier. As long as successive bits are of the same binary value there will be no change in phase of the modulated carrier signal. A suitable transmission medium, which forms no part of the present invention, is provided for conveying the output from the digital modulator to the receiver contained at the receiving station.

A receiver may be considered as being comprised of four separate sections. The first section is a square wave oscillator which provides clock signals for gating the modulated carrier at appropriate times, such that the data signals can be removed therefrom by suitable digital techniques. The second section of the demodulator is a novel arrangement of conventional digital logic circuits which is adapted to receive the modulated carrier signal for producing synchronizing signals upon predetermined axis crossings of the received modulated carrier. The synchronizing signals are in turn applied to the oscillator to ensure that the oscillator output has a proper phase relationship with respect to the modulated carrier signal such that accurate demodulation may be achieved. The third section is that which achieves demodulation and is the demodulator. The fourth section consists of circuits which amplify, filter, shape and otherwise render the signal as received from the transmission system into a usable form for the following digital circuits. This section remains largely analog in nature.

It is accordingly an object of the present invention to provide an improved digital data communication system which is capable of operating at substantially higher bit rates and which is less subject to errors in communication due to noise than has been obtainable with prior art configurations.

Another object of the present invention is to provide a modulator and demodulator for a communcations system wherein digital type components are employed in place of conventional analog elements commonly found in prior art systems.

Still another object of the present invention is to provide novel synchronizing circuits for synchronizing a clock oscillator with a received modulated carrier signal such that the data is recovered from the modulated carrier signal in a highly reliable fashion.

These and other objects of the invention will become apparent to those of ordinary skill in the art by reference to the following detailed description of the exemplary embodiments of the apparatus and the appended claims. The various features of the exemplary embodiments according to the invention may best be understood with reference to the accompanying drawings wherein:

Figure 1:
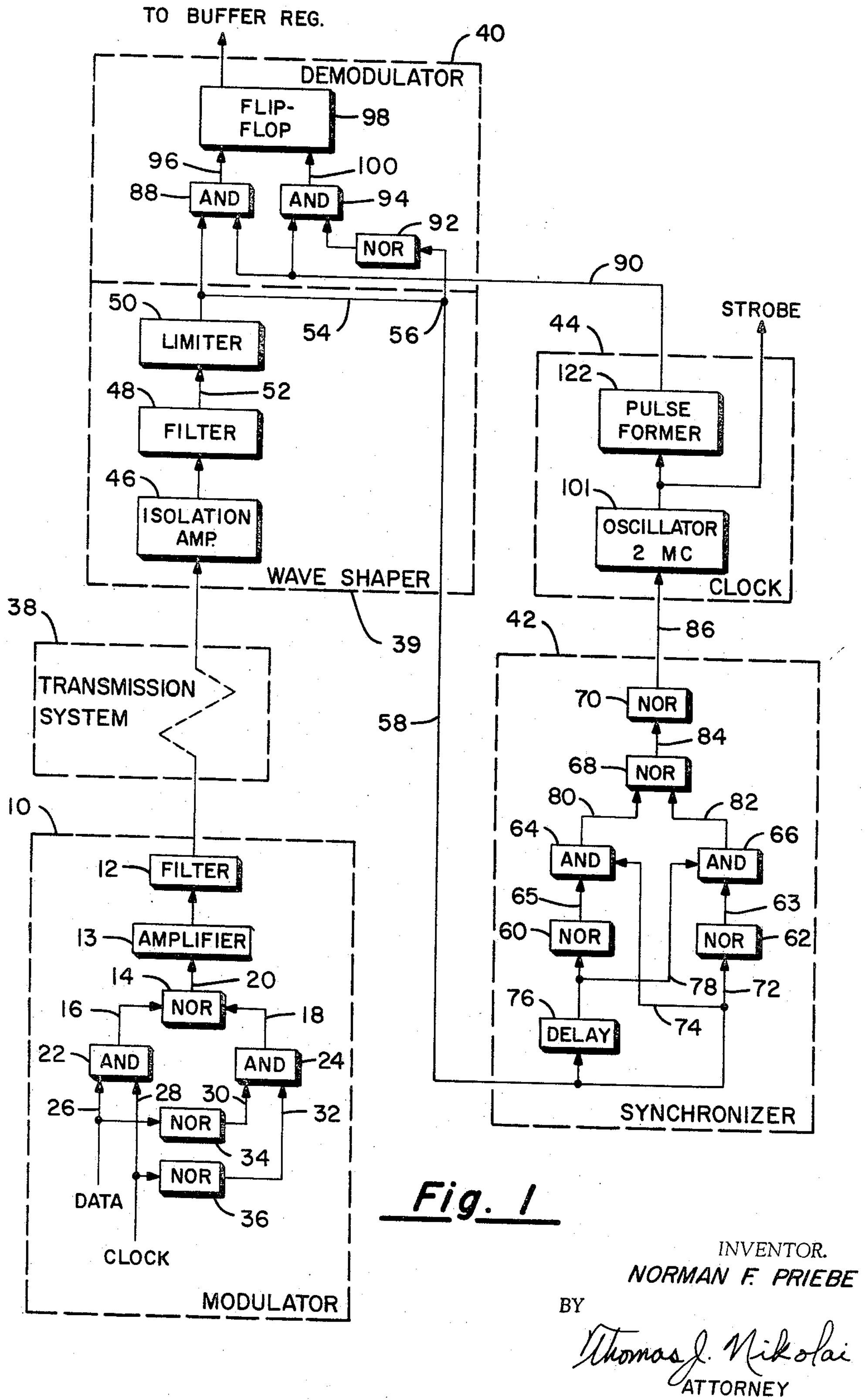
FIG. 1 illustrates in logical block diagram form the exemplary embodiment of the digital communication system of this invention.

Referring now to FIG. 1, the modulator portion of the data transmission system is shown enclosed by dashed lines 10 and includes as its major components a filter network 12, an amplifier 13, and a logical NOR circuit 14 having a pair of input terminals 16 and 18, and an output terminal 20. Additionally, there is provided a pair of logical AND circuits 22 and 24 whose output terminals are connected to the input terminals 16 and 18, respectively, of the NOR circuit 14. Each of the AND circuits 22 and 24 have a pair of input terminals. More specifically, AND circuit 22 is provided with input terminals 26 and 28 while AND circuit 24 has input terminals 30 and 32. The input terminal 26 is adapted to receive data representing signals from a source (not shown), the data representing signals being binary in form. The input 28 is adapted to receive the regularly occurring rectangular wave clock signals from a source (not shown), said wave serving as the carrier. The inputs to the gate 24 via terminals 30 and 32 are applied by way of the single input NOR circuits (inverters) 34 and 36, respectively. Hence, the input terminal 30 receives the data signal in inverted form while the input terminal 32 receives the clock signals in inverted form. The output terminal 20 of NOR circuit 14 is connected as an input to the filter 12, the output of the filter being applied by way of transmitting medium which may include a radio link or a transmission line to the input of the receiver. The transmitting medium is indicated schematically in the system configuration of FIG. 1 as being enclosed by dashed line 38.

As was mentioned before, the receiver portion of the system may be considered as being comprised of four sections, namely, the wave shaper section, the demodulator section, the synchronizer section and the oscillator or clock section. The wave shaper section is shown enclosed by dashed line 39, the demodulator section is shown enclosed by dashed line 40, while the synchronizer and oscillator sections are shown enclosed by dashed lines 42 and 44, respectively.

The incoming carrier modulated signal from the transmission medium 38 is applied first to an isolation amplifier 46, the function of which is to match the impedance of the receiver to that of the transmission line. This amplifier may conveniently include a transistor emitter-follower stage, the design of which is well known in the art. The output from the isolation amplifier is applied to a filter 48 and the output from the filter is in turn applied to the input of a limiter circuit 50 by way of conductor 52. The limiter network 50 may include a pulse amplifier and clipping network for shaping the received waveform into rectangular pulses having sharp rise and fall time characteristics.

The shaped ouput from the limiter 50 is applied by way of a conductor 54 to a junction 56 on conductor 58. The conductor 58 connects to the axis crossing detector or synhronizer 42, which includes as components thereof a pair of inverters (single input NOR circuits) 60 and 62, a pair of AND circuits 64 and 66, a NOR circuit 68 and an inverter 70 (single input NOR circuit). The output signal from the limiter appearing on conductor 58 is applied to the input terminal of invertor NOR 62 by way of conductor 72 and to a first input terminal of the gate 64 by way of a conductor 74. Similarly, the output signal from the limiter appearing on conductor 58 is delayed by means of a delay device 76 and is applied to the input terminal of inverter NOR 60 and to a first input terminal of the gate 66 by way of conductor 78. The other inputs to the gates 64 and 66 come from the output terminals of inverters NOR 60 and NOR 62, respectively.

The NOR circuit 68 has two input terminals 80 and 82 which are respectively connected to the output terminals of the AND gates 64 and 66. The output signal from the NOR circuit 68 appearing on the conductor 84 is inverted by means of inverter circuit NOR 70 and applied by way of conductor 86 to the oscillator section 44 of the receiving station.

The output signal from the limiter 50 is also applied to a first input terminal of AND circuit 88 in the demodulator section 40 of the receiver. The other input to this last mentioned AND circuit comes from the oscillator section 44 by way of conductor 90. The output signal from the limiter appearing at the junction 56 is also inverted by NOR circuit 92 and applied as a first input signal to the AND gate 94. The second input to the AND gate 94 comes from the oscillator section 44 by way of conductor 90.

The output from the AND gate 88 is connected to the SET terminal 96 of the bistable circuit 98. The output from AND gate 94, on the other hand, is applied to the CLEAR terminal 100 of the flip-flop 98.

Now that the lay-out of the system has been described in detail, consideration will be given to the mode of operation.

*Operation*

Prior art demodulation techniques employed to recover information or data from pulse or digitally modulated carrier waves have in general utilized analog devices. For phase shift modulation, for example, the balanced modulator was commonly used. This balanced modulator produces an output which is proportional to the product of the phase of the input data with respect to the carrier or reference signal. The circuit of this invention utilizes standard logic circuits of the type commonly found in digital data processing equipment to perform the modulation and demodulation functions. In other words, digital techniques are employed throughout the system of this invention rather than analog techniques. Accordingly, the system of the present invention is extremely reliable in that the rate of occurrence of errors in the transmission of data is substantially lower than has been obtainable with prior art techniques.

Figure 2:
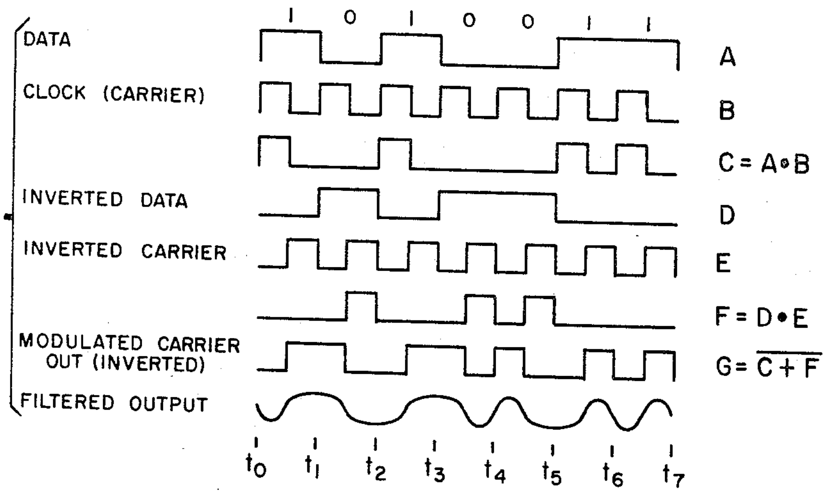
FIG. 2 illustrates the wave forms associated with the modulator portion of the system of FIG. 1.

As an aid in the understanding of the operation of the modulator section 10 of this invention, reference is made to the waveforms in FIGURE 2 which illustrate the shape of the signals appearing at various points in the circuit when the arbitrary pattern of data signals illustrated in FIG. 2A is applied to the data input terminal of the modulator. As is shown in FIG. 2A, the data is represented by signals which change in level when there is a change in the binary value from one bit period to the next bit period. This is commonly known in the art as a non-return to zero (NRZ) coding scheme. The waveform of FIG. 2A represents the serial data train 1010011. The clock or carrier signals are applied to the clock input terminal of the modulator. It is a requirement for proper operation of the system, that the clock signals of FIG. 2B be kept in synchronism with the data signals of FIG. 2A. Since various types of coding or keying devices are known in the art for generating binary data signals and clock signals in synchronism, it is felt to be unnecessary to describe in detail a particular piece of apparatus for performing this function. The preferred frequency of oscillation of the clock signal for the present invention is 2 megacycles, but limitation to this frequency is not intended.

The data signals of FIG. 2A and the clock or carrier signals of FIG. 2B are applied by way of the conductors 26 and 28 to the input terminals of the AND circuit 22. As a result, a signal train having the waveform of that shown in FIG. 2C appears on the output conductor 16 of the AND gate 22. The data signals are also applied to the single input NOR circuit 34 which serves as an inverter. Hence, the signal train appearing on the conductor 30 will have the waveshape identical to that of the data except that it is inverted in polarity or phase. This waveform is shown in FIG. 2D.

In a similar manner, the clock or carrier signals are applied to the NOR circuit 36 causing these signals to be inverted. The waveform of the inverted carrier signals appearing on the conductor 32 is illustrated in FIG. 2E. The inverted data and the inverted carrier are applied to the two input terminals of AND gate 24. As a result, an output signal will appear on the conductor 18 only when both of the inputs to the AND gate 24 are simultaneously positive. A study of the waveforms of FIGS. 2D and 2E will show that the waveform of FIG. 2F will appear on the output conductor 18 of the AND gate 24.

The output signals from the gates 22 and 24 are applied as inputs to a NOR circuit 14. As is well known in the art, a logical NOR circuit is a device which produces a logical "1" output signal only when both of its inputs are at a logical "0" level. If any one of the input signals is at a logical "1" level, the output from the NOR circuit will be a logical "0" signal. With the waveforms of FIGS. 2C and 2F applied to the NOR circuit 14, the output pulse train appearing on the conductor 20 will have the wave pattern shown in FIG. 2G. Again, this is based on the premise that the data waveform is that of FIG. 2A.

A comparison of the waveforms of FIGS. 2A and 2G reveals that the effect of the logic circuits comprising the modulator are to cause the clock or carrier wave of FIG. 2B to be modulated so as to contain data or information in the pase relationship of adjacent bits. More specifically when the data signal shifts from the "1" level to the "0" level at the time $t_1$, the output on conductor 20 swings from a positive polarity to a negative polarity. Similarly, at the time $t_2$ when the data shifts from the binary "0" level to the binary "1" level the output signal from NOR circuit 14 swings from a negative level to a positive level. It can be seen that this is equivalent to a 180° phase shift. At the time $t_3$ when the data shifts from the "1" level to the "0" level the output signal on conductor 20 again shifts from a positive value to a negative value. However, at the time $t_4$ when the data remains at the binary "0" level the output waveform again switches from a positive value to a negative value. Thus, it can be seen that there is no shift or change in the phase relationship of adjacent signals when there is no change in the data being transmitted. At the time $t_5$ when the data shifts from the 0 level to the 1 level, the output signal on line 20 swings from a negative polarity to a positive polarity. Because at the time $t_6$ there is no change in the data (it remains at the 1 level) the output signal again swings from a negative polarity to a positive polarity which is the same phase as the output signal which appeared in the time period between $t_5$ and $t_6$. Thus, it is apparent that the logic circuits making up the modulator 10 are effective to produce a phase-shift on change-of-data modulated carrier. This modulated carrier is applied to an amplifier 13 which amplifies the signal power to a level sufficient to drive the transmission system and a filter 12 which is effective to remove the high frequency components of the waveform thereby decreasing the bandwidth requirements of the transmitting system 38.

The transmission system shown enclosed by the dashed lines 38 is symbolic only since various types of media may be employed. For example, the transmission system may take the form of a conductive transmission line which directly connects the transmitter to the receiving station or it may, in turn, be a radio link wherein the modulated carrier is transmitted without the use of conductors.

Figure 3:
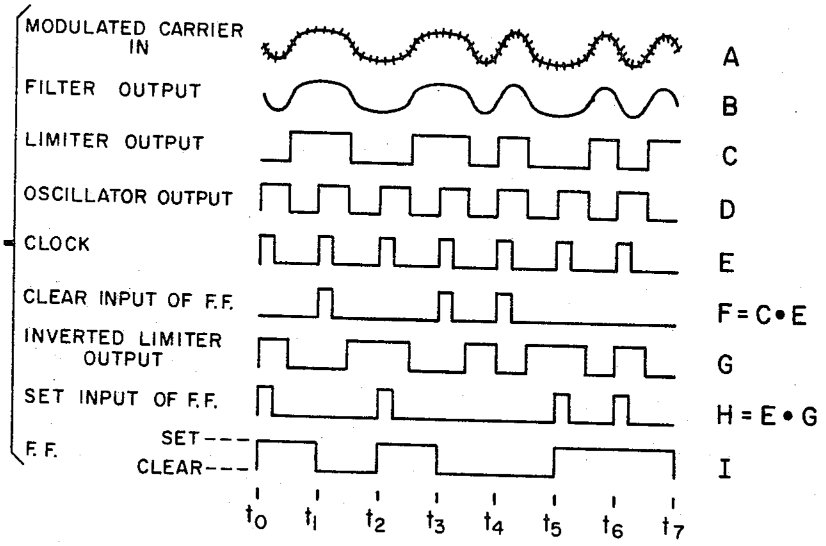
FIG. 3 illustrates the various wave forms produced during demodulation of an incoming pulse modulated carrier signal.

As was mentioned earlier, the receiving station of the communications system of this invention includes a wave shaper section, a demodulator section, a synchronizer section and a clock section which are shown enclosed by the dashed lines 39, 40, 42 and 44, respectively. Referring to the waveforms of FIG. 3 it can be seen that the modulated carrier is applied to an isolation amplifier 46 which serves to match the impedance of the receiving station to that of the transmission line to obtain an optimum power transfer and eliminate reflections. The isolation amplifier 46 may conveniently take the form of an emitter follower transistor amplifier, many types of which are well known in the art. The output from the isolation amplifier 46 is applied to the filter network 48 which is effective to remove noise signals outside of the signal energy band from the modulated carrier input. The input to the filter is shown in FIG. 3A, the output from the filter being shown in FIG. 3B.

After being filtered, the modulated carrier signal is applied to a limiter network 50. The limiter 50 may conveniently take the form of a pulse amplifier and clipping network which operates in a well known manner to produce rectangular pulses of fast rise and fall time. The output from the limiter circuit 50 is shown in the waveform of FIG. 3C.

Figure 4:
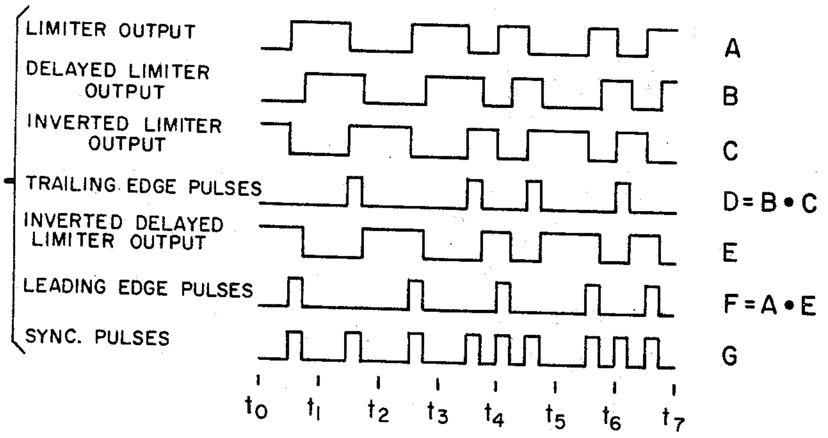
FIG. 4 illustrates the wave forms received and produced by the axis crossing detector of the system of FIG. 1.

To understand the operation of the synchronizer, reference is made to the waveforms of FIG. 4. The output from the limiter 50 is applied by way of conductor 54 to a junction 56. From junction 56 the signals are conveyed via conductor 58 to the input of a delay means 76. The waveform of the signal appearing on conductor 58 is shown in FIG. 4A. The delay means 76 may take the form of one or more inverter stages (single input NOR circuit) since there is a definite delay time associated with such networks. A conventional delay line may also be employed. The output from the delay network 76 appearing on conductor 78 is shown in the waveform of FIG. 4B. When this is compared with the waveform of FIG. 4A, it can be seen that it is displaced therefrom in time by a predetermined amount. The undelayed output from the limiter 50 is applied to and inverted by the single input NOR circuit 62 causing the waveform of FIG. 4C to appear on the conductor 63, which is connected to a first input terminal of AND gate 66. The second input to AND gate 66 comes by way of conductor 78 and, as was mentioned previously, is the delayed output from the limiter 50. The waveform of FIG. 4D illustrates the output signal which appears on conductor 82 when the waveforms of FIGS. 4B and 4C are applied to the inputs of gate 66.

The delayed output from the limiter 50 is inverted by the single input NOR circuit 60 causing the waveform of FIG. 4E to appear on the conductor 65, which is connected to one input terminal of AND circuit 64. The other input to this last mentioned AND circuit comes by way of the conductor 74 and conveys the undelayed output from the limiter 50. The AND circuit 64 operates in a conventional manner to cause the waveform of FIG. 4F to appear on the output connector 80. As is illustrated, the outputs from the gates 64 and 66 are applied to two inputs of a NOR circuit 68. As a result, the waveform of FIG. 4G appears on the conductor 84, which is the output of NOR circuit 68.

When the waveform of FIG. 4G is compared with the modulated carrier output signal from the limiter 50, the waveform of which is shown in FIG. 4A, it can be seen that there is produced a narrow pulse at both the leading and trailing edges of each data pulse. As will be described later on in the specification, the synch pulses of FIG. 4G are applied to the receiver clock oscillator to maintain the clock in synchronism with the received modulated carrier.

While it is often times desirable to have synchronizing pulses at both the leading and trailing edges of the data pulses, it is in some instances sufficient to have a single pulse developed at either the leading edge or trailing edge of the data pulse. Whether or not synchronizing pulses are required at the leading and trailing edge of the received data pulse is dependent upon the characteristics of the oscillator employed in the clock section of the receiver. Where only a single synchronizing pulse per data pulse is required, the synchronizing section 42 of FIG. 1 may be modified by eliminating the NOR circuit 62, the AND circuit 66 and the connection 78. An examination will reveal that when the remaining portion of the synchronizer receives the modulated carrier and the delayed modulated carrier, synchronizing pulses will be produced only at the trailing edge of the output signals from the limiter and will last for a duration determined by the length of the delay of element 76.

Figure 5:
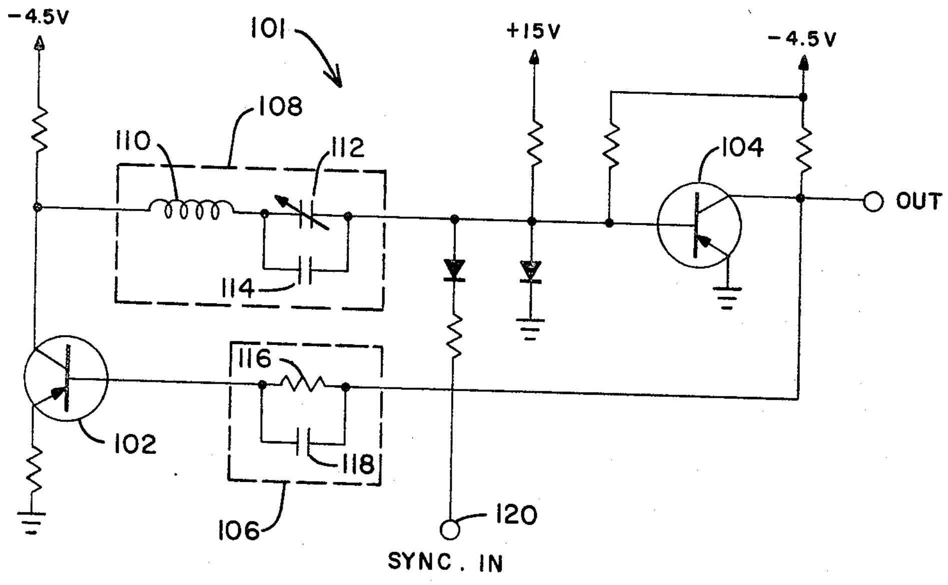
FIG. 5 illustrates schematically an oscillator suitable for use in the system of FIG. 1.

FIG. 5 illustrates schematically a transistor oscillator suitable for use in the clock section 44 of the receiver. This circuit is a two stage oscillator having a pair of transistors 102 and 104 cross-connected through a suitable feedback network 106 to provide a sustained oscillation at a frequency determined by the characteristics of the tank circuit 108. More specifically, the collector electrode of the transistor 102 is connected through the tank circuit which includes the inductor 110, the variable capacitor 112 and the fixed capacitor 114 connected in parallel with the variable capacitor to the base electrode of the transistor 104. The collector of the transistor 104 is connected through the feedback network including resistor 116 and capacitor 118 to the base electrode of the transistor 102. In the preferred embodiment of the present invention the components of the tank circuit 108 are chosen such that the circuit produces sustained oscillations at a frequency of 2 megacycles.

The oscillator circuit of FIG. 5 is maintained in synchronism with the incoming data by means of the synch input connection 120 which is adapted to be connected to the output of the NOR circuit 70 in the synchronizer section 42 of the receiver. As was shown in the waveform of FIG. 4G, the synchronizing pulses from NOR circuit 58 are positive going pulses occurring at the leading and trailing edge of the pulses comprising the limiter output. The single input NOR circuit 70 serves to invert these pulses so that the signals appearing on conductor 86 and applied to the synch input terminal 120 are negative going pulses appearing at the leading and trailing edges of the limiter output pulses. It may be recalled that the output from the limiter comprises the received modulated carrier signal after it is filtered and shaped.

The negative pulses applied to the terminal 120 are of a sufficient magnitude to ensure that the PNP transistor 104 is rendered fully conductive. As a result, each time a synchronizing pulse is produced by the synchronizer network 42, the oscillator is forced to a condition where the transistor 104 is fully conducting, causing the potential on the collector electrode of transistor 104 to rise. The positive going signal appearing on the collector electrode transistor 104 is coupled back through the feed-back network 106 and serves to render the transistor 102 nonconducting. It can be seen, then, that the synchronizing signals are effective to maintain the oscillator of FIG. 5 in synchronism with the incoming data. The waveform of FIG. 3D illustrates the shape of the output signals from the oscillator 101. These signals, are in turn, fed to the input terminal of a pulse former 122 such as a one-shot multi-vibrator which is used to shape the oscillator output to a waveshape having a duty cycle less than 50%. The output from the one-shot multi-vibrator is illustrated in FIG. 3E. As an alternate embodiment a circuit consisting of the leading edge detection portion of the synchronizer 42 may be used to obtain the narrow pulses. It should be noted that a differentiator will also do the same thing, but because a differentiator yields a slow fall time not compatible with the fast switching and low power ratings of transistor types used, it is not preferred.

Figure 7:
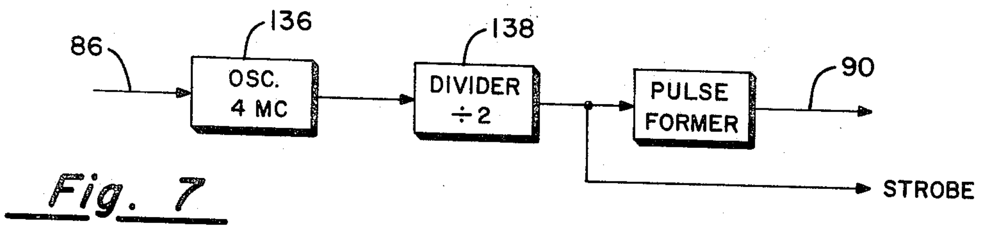
FIG. 7 illustrates an alternate embodiment of the clock section of FIG. 1.

Another embodiment of the oscillator is shown in FIG. 7. In this case the oscillator 136 produces sustained oscillations at a frequency twice that of the carrier frequency. The divider 138 following divides by 2 to yield the desired frequency. Using this approach, the synchronizing pulses will always be in phase with the oscillator. This is necessary for most oscillators. The divider may be any of the types well known to the art, such as the binary flip-flop divider or the locked oscillator divider. The preferred oscillator frequency for the present invention is 4 mc.

Now that it has been shown how clock signals are produced which are synchronized with the incoming data to be demodulated, consideration will next be given to the operation of the demodulator section 40 of the receiver. The output from the pulse former appears on the conductor 90 and is applied to the first input terminal of the AND gates 88 and 94, which are respectively connected to the CLEAR and SET terminals of the flip-flop 98. The second input to the AND gate 88 comes from the output of the limiter 50 and when the gate is fully enabled, i.e. when the output from the clock and the output from the limiter are simultaneously positive, a signal is produced on the conductor 96 to clear the flip-flop 98 to its "0" state. The waveform of FIG. 3F illustrates the pattern of pulses applied to the CLEAR terminal of the flip-flop, when the data pattern which has been shown herein for the purpose of illustration is applied.

The modulated carrier signals appearing at the output of the limiter 50 pass by way of conductor 54 to the junction 56 and from there to an input to NOR circuit 92. The output from NOR circuit 92 is therefore the inverted representative of the modulated carrier after it has been received and shaped. The waveform of FIG. 3G depicts these signals.

The output from NOR circuit 92 is connected to a second input terminal of AND gate 94. The first input to the last mentioned AND gate comes from the output of the pulse former 122 in the clock section of 44 of the receiver by way of conductor 90. When the output from the clock and the limiter output from NOR circuit 92 are simultaneously positive, the AND gate 94 will be fully enabled and will produce an output pulse on the conductor 100 connected to the SET-side of the flip-flop 98. With the assumed data pattern received by the demodulator, the signal pattern appearing on conductor 100 will have the wave shape of that shown in FIG. 3H.

With the signals of FIG. 3F applied to the CLEAR terminal of the flip-flop 98 and the signal of FIG. 3H applied to the SET side of the flip-flop 98, it can be seen that the flip-flop will produce an output signal pattern corresponding to that shown in the waveform of FIG. 3I.

A comparison of the waveform of FIG. 3I with that of FIG. 2A immediately reveals that they are identical and that the data received at the demodulating station is identical to the pattern of data used to modulate the carrier signal in the modulator section 10 of the transmitter.

Figure 6:
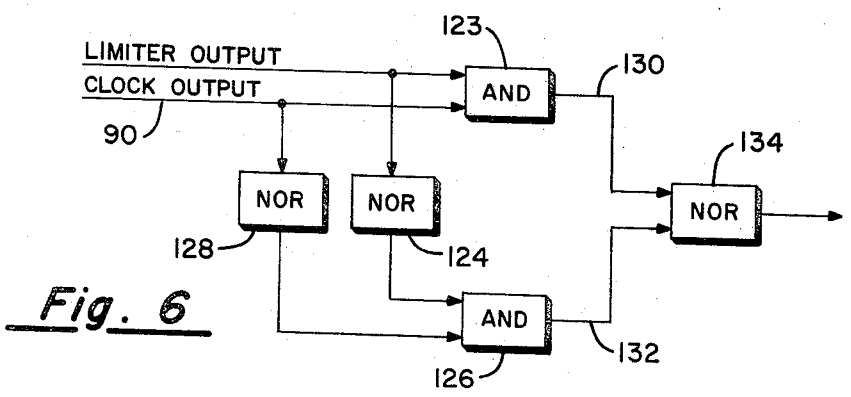
FIG. 6 illustrates an alternate embodiment of the demodulator section of FIG. 1.

FIG. 6 illustrates an alternate arrangement for the demodulator shown in the preferred embodiment of FIG. 1. In this arrangement the output from the limiter 50 is applied in direct form to a first input terminal of AND gate 123 and inverted form (via NOR circuit 124) to a first input terminal of AND gate 126. In a like manner, the output from the clock appearing on the conductor 90 (FIG. 1) is applied directly to the second input terminal of AND gate 122 and in inverted form (via NOR circuit 128) to the second input terminal of the AND gate 126. The output signals from the AND gates 123 and 126 are applied by way of conductors 130 and 132 to the input terminals of an OR circuit 134. A study of the circuit of FIG. 6 will reveal that if the limiter output signals of FIG. 3C and the clock signals of FIG. 3D are applied to the circuit of FIG. 6, the signal pattern appearing at the output of NOR circuit 134 will be identical to that shown in the waveform of FIG. 3I. Note that this alternate arrangement is identical to that circuit used as the modulator, 10, in FIG. 1.

There has accordingly been described and shown herein a novel and useful system for transmitting data and recovery same, said system utilizing conventional digital logic circuits throughout. Although this invention has been described with respect to particular embodiments thereof, it is not to be so limited to changes and modifications may be made therein which are within the whole intended scope of the invention as defined by the appended claims.

What is claimed is:

1. A digital communications system comprising in combination:

a source of regularly occurring square wave carrier signals, a source of binary coded data, said data being represented by a serial signal train of bivalued pulses, modulator means connected to receive said carrier signals and said serial signal train for producing modulated carrier signals wherein phase shifts of said carrier signals are generated on changes of state of said pulses in said signal train, means for transmitting said modulated carrier signal train to a receiving station, said receiving station including a source of clock signals, synchronizing means responsive to the received modulated carrier signals for producing an output pulse each time the level of said received modulated carrier signals changes from one binary value to the opposite binary value, means connecting said synchronizing means to said source of clock signals such that said output pulses control said source of clock signals, and means connected to receive said received modulated carrier signals and said clock signals for separating said carrier signals from said received modulated carrier signals.

2. Apparatus as in claim 1 wherein said modulator means comprises:

a NOR circuit having a pair of input terminals and an output terminal, a pair of AND circuits each having first and second input terminals and an output terminal, the output terminals of said pair of AND circuits being connected to respective ones of said pair of input terminals of said NOR circuit;

a pair of NOR circuits each having an input terminal and an output terminal, means connecting the output terminals of said pair of NOR circuits to said first and second input terminals of a first of said pair of AND circuits, means connecting said source of carrier signals to the input terminal of one of said pair of NOR circuits and to said first terminal of the second of said pair of AND circuits, and means connecting said source of binary coded data to the input terminal of the other of said pair of NOR circuits and to said second terminal of the second of said pair of AND circuits.

3. Apparatus as in claim 1 wherein said synchronizing means includes:

first and second NOR circuits each having at least an input terminal and output terminal, first and second AND circuits each having a pair of input terminals and an output terminal, delay means connected to the input of said first NOR circuits and to one input terminal on said first AND circuit, means connecting the output terminal of said second NOR circuit to the other input terminal on said first AND circuit, means connecting the output terminal of said first NOR circuit to one input terminal of said second AND circuit;

means for applying said received modulated carrier signal to the input of said delay means, to the input terminal of said second NOR circuit and to the other of said pair of input terminals on said second AND circuit, a third NOR circuit having first and second input terminals and an output terminal, and means connecting the output terminals of said first and second AND circuits to the first and second input terminals of said third NOR circuit, the arrangement being such that pulse signals appear at the output of said third NOR circuit each time said received modulated carrier signal changes from one binary value to the opposite binary value.

4. Apparatus as in claim 1 wherein said synchronizing means includes a series circuit having signal inverting means and delay means adapted to receive said received modulated carrier signal, an AND circuit having a first input terminal connected to the output of said series circuit and a second input connected to receive said received modulated carrier signal, and inverter means connected to the output of said AND circuit, the arrangement being such that synchronizing pulses are produced at the output of said inverter means each time said received modulated carrier signal shifts from a first binary level to a second binary level.

5. Apparatus as in claim 1 wherein said last mentioned means includes:

a bistable circuit having set and clear input terminals; first gating means connected to said set input terminal, second gating means connected to said clear input terminal, means connecting the output of said source of clock signals to one input terminal of said first and second gating means, circuit means for applying said modulated carrier signals to a second input terminal of said first gating means, and means for applying said modulated carrier signals in inverted form to a second input terminal of said second gating means.

6. Apparatus as in claim 5 wherein said circuit means includes signal amplifying means and limiting means for shaping said received modulated carrier signal.

7. Apparatus as in claim 1 wherein said last mentioned means includes:

first and second AND circuits each having a pair of input terminals and an output terminal, a pair of NOR circuits each having at least one input terminal and one output terminal, and NOR circuit connected to the output terminals of said first and second AND circuits, means connecting the output terminals of said first and second NOR circuits to said pair of input terminals of said first AND circuit, means connecting the output of said source of clock signals to one of said pair of input terminals of said second AND circuit and to the input terminal of one of said pair of NOR circuits, and means connecting said received modulated carrier signals to the other of said pair of input terminals on said second AND circuit and to the input terminal of the other of said pair of NOR circuits.

8. A digital communication system as in claim 1 wherein said source of binary coded data includes means for generating said serial signal train in a nonreturn-to-zero coding system.

9. For use in a data communication system, a modulator circuit for producing a phase shift of a carrier signal for each change of level of serial binary data signals to be transmitted, comprising: a NOR circuit having a pair of input terminals and an output terminal; a pair of AND circuits each having first and second input terminals and an output terminal, the output terminals of said pair of AND circuits being connected to respective ones of said pair of input terminals of said NOR circuit; a pair of inverter circuits each having an input terminal and an output terminal; means connecting the output terminals of said pair of inverter circuits to said first and second input terminals respectively of a first of said pair of AND circuits; means coupled to an input terminal of one of said inverter circuits and said first terminal of the second of said pair of AND circuits for receiving a cyclically occurring carrier signal to be modulated; and means coupled to the input terminal of the other of said pair of inverter circuits and to said second terminal of the second of said pair of AND circuits for receiving serially binary coded data signals to be utilized in modulating said carrier signal, said modulated signals appearing at said output terminal of said NOR circuit.

10. For use in a data communication system including a modulator circuit that provides a modulated carrier signal wherein there is a phase shift of the carrier signal for each change of level of the serial binary data signal to be transmitted, a demodulating synchronizer comprising: first and second inverter circuits each having at least an input terminal and an output terminal; first and second AND circuits each having a pair of input terminals and an output terminal; delay means coupled to the input terminal of said first inverter circuit and to one input terminal of said first AND circuit; means connecting the output terminal of said second inverter circuit to the other input terminal of said first AND circuit; means connecting the output terminal of said first inverter circuit to one input terminal of said second AND circuit; means for receiving a modulated carrier signal and applying said received modulated carrier signal to the input of said delay means, to the input terminal of said second inverter circuit, and to the other of said pair of input terminals of said second AND circuit; a NOR circuit having first and second input terminals and an output terminal, and means connecting the output terminals of said first and second AND circuits to the first and second input terminals of said NOR circuit, the arrangement being such that pulse signals appear at the output of said NOR circuit each time said received modulated carrier signal changes from one binary value to the opposite binary value.

References Cited

UNITED STATES PATENTS

| | | | |
|---|---|---|---|
| 3,142,723 | 7/1964 | Fleming | 325—30 X |
| 3,160,812 | 12/1964 | Scantlin | 325—30 |

JOHN W. CALDWELL, *Acting Primary Examiner.*

J. T. STRATMAN, *Assistant Examiner.*